(12) United States Patent
Acharya (10) Patent No.: US 6,301,392 B1
(45) Date of Patent: Oct. 9, 2001

(54) EFFICIENT METHODOLOGY TO SELECT THE QUANTIZATION THRESHOLD PARAMETERS IN A DWT-BASED IMAGE COMPRESSION SCHEME IN ORDER TO SCORE A PREDEFINED MINIMUM NUMBER OF IMAGES INTO A FIXED SIZE SECONDARY STORAGE (75) Inventor: Tinku Acharya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/146,159

(22) Filed: Sep. 3, 1998

(51) Int. Cl.[7] .................................................. G06K 9/36

(52) U.S. Cl. .......................................... 382/239; 348/231

(58) Field of Search .................................... 382/239–240, 382/251–270, 272–273; 375/240.05; 348/231, 232

(56) References Cited

U.S. PATENT DOCUMENTS

| | | | |
|---|---|---|---|
| 5,333,012 | * 7/1994 | Singhal et al. | 375/240.04 |
| 5,677,969 | * 10/1997 | Auyeung et al. | 382/239 |
| 5,692,074 | * 11/1997 | Kunitake | 382/239 |
| 5,732,156 | * 3/1998 | Watanabe et al. | 382/239 |
| 5,937,100 | * 8/1999 | Kitajima | 382/251 |
| 5,963,673 | * 10/1999 | Kodama et al. | 382/239 |
| 5,991,515 | * 11/1999 | Fall et al. | 358/1.15 |

* cited by examiner

Primary Examiner—Joseph Mancu
Assistant Examiner—Ali Bayat
(74) Attorney, Agent, or Firm—Blakely, Sokoloff, Taylor & Zafman LLP (57) ABSTRACT

A method comprising selecting a quantization threshold parameters set based upon available storage in a storage mechanism configured to store quantized image data, and quantizing image data using the selected quantization threshold parameter set, the selecting and quantizing guaranteeing that at minimum number (M) of quantized image data can be stored in the storage mechanism.

22 Claims, 6 Drawing Sheets

EFFICIENT METHODOLOGY TO SELECT THE QUANTIZATION THRESHOLD PARAMETERS IN A DWT-BASED IMAGE COMPRESSION SCHEME IN ORDER TO SCORE A PREDEFINED MINIMUM NUMBER OF IMAGES INTO A FIXED SIZE SECONDARY STORAGE

BACKGROUND OF THE INVENTION

1. Field of the Invention

The invention relates generally to data and image compression. More specifically, the invention relates to thresholding for quantization performed during image compression, particularly where discrete wavelet transform techniques are utilized.

2. Description of the Related Art

Image compression plays a key role in multimedia applications such as videoconferencing, digital imaging and video streaming over a network. In the art of image compression, the goal is to reduce the bit rate of storage and/or transmission while still maintaining an image quality that is acceptable for the intended application.

Image compression techniques can be classified as either "lossy" or "lossless". With lossless compression, the original image prior to compression can be exactly recovered when the compressed image is decompressed. Consequently, lossless techniques, whose compression ratios depend upon the entropy of an image, do not ordinarily achieve high compression ratios and, since they preserve a high percentage of original image information, may also be computationally expensive. By contrast, lossy compression schemes provide only an approximation of the original image. Thus, with lossy compression, greater compression ratios can be achieved but often with loss in image quality compared to lossless techniques. One such lossy technique is a transform-based coding known as JPEG (Joint Photographic Experts Group) which transforms pixels of an input image using the well-known Discrete Cosine Transform (DCT). Another transform-based technique, in vogue more recently is the DWT (Discrete Wavelet Transform) which unlike JPEG does not operate on a fixed block size basis. Whether JPEG or DWT, the resulting transformed pixel values are "quantized" or mapped to smaller set of values in order to achieve compression. The quality of a compressed image that is decompressed will depend greatly on how the quantization of the transformed pixels are performed. The compression ratio (the size of the original raw image compared to the compressed image) will also be affected by the quantization. After such compression, the compressed data set can be entropy encoded in a form suitable for transmission or storage.

When images are captured and/or compressed on imaging devices such as digital cameras, these devices are often provided with a storage mechanism such as a disk drive or card-based memory unit. Such storage mechanisms have a fixed and often smaller capacity in comparison to similar mechanisms in general purpose computing machines. For a device such as a digital camera, the relevant measure of storage capability from a user/consumer standpoint is not the total number of bytes capacity to store images, but rather, the total number of images that can be stored. This evolves from the nature of cameras in which a film is loaded and has a set number of exposures (say 24) or pictures that it can capture. Likewise, in marketing a digital camera, it may be desirable to guarantee the user that the camera can capture a fixed number of images before its storage mechanism needs to be emptied to capture yet more images. If the compression achieved by quantization and entropy encoding is variable, then the compressed and stored image size will also be variable.

If images are to be compressed on a digital camera or other imaging device using variable compression ratio techniques, then there is a need for a means of guaranteeing the number of images storable in a fixed size storage mechanism.

SUMMARY OF THE INVENTION

What is disclosed is a method comprising selecting a quantization threshold parameters set based upon available storage in a storage mechanism configured to store quantized image data, and quantizing image data using the selected quantization threshold parameter set, the selecting and quantizing guaranteeing that at minimum number (M) of quantized image data can be stored in the storage mechanism.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

It is desirable in digital applications such as still or motion imaging that an original image such as one captured by a digital camera be compressed in size as much as possible while maintaining a certain level of quality prior to its being transferred for decompression and displayed. The disclosed compression technique, that is the subject of one or more embodiments of the invention, is capable of guaranteeing that at least a certain number of images can be stored into a fixed size storage medium.

Figure 1:
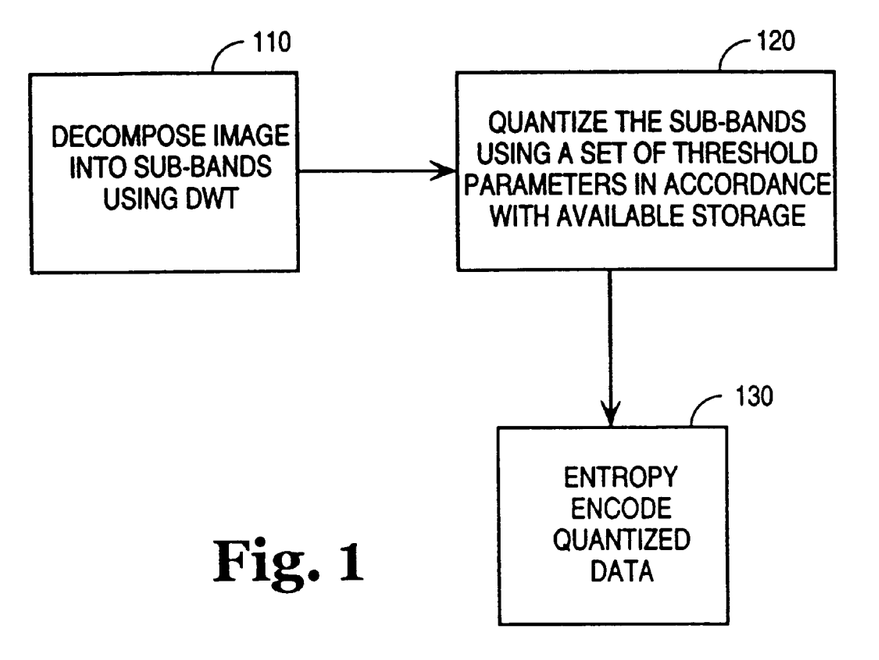
FIG. 1 illustrates image compression data flow according to one embodiment of the invention.

FIG. 1 illustrates image compression data flow according to one embodiment of the invention.

It is often desirable in digital applications such as still or motion imaging that an original image such as one captured by a digital camera be compressed in size as much as possible while maintaining a certain level of quality prior to its being transferred for decompression and/or display. One such image compression technique is based upon the DWT (Discrete Wavelet Transform) mentioned above. Such a technique can yield compressed images that may each be of variable size after the DWT is performed.

Figure 3:
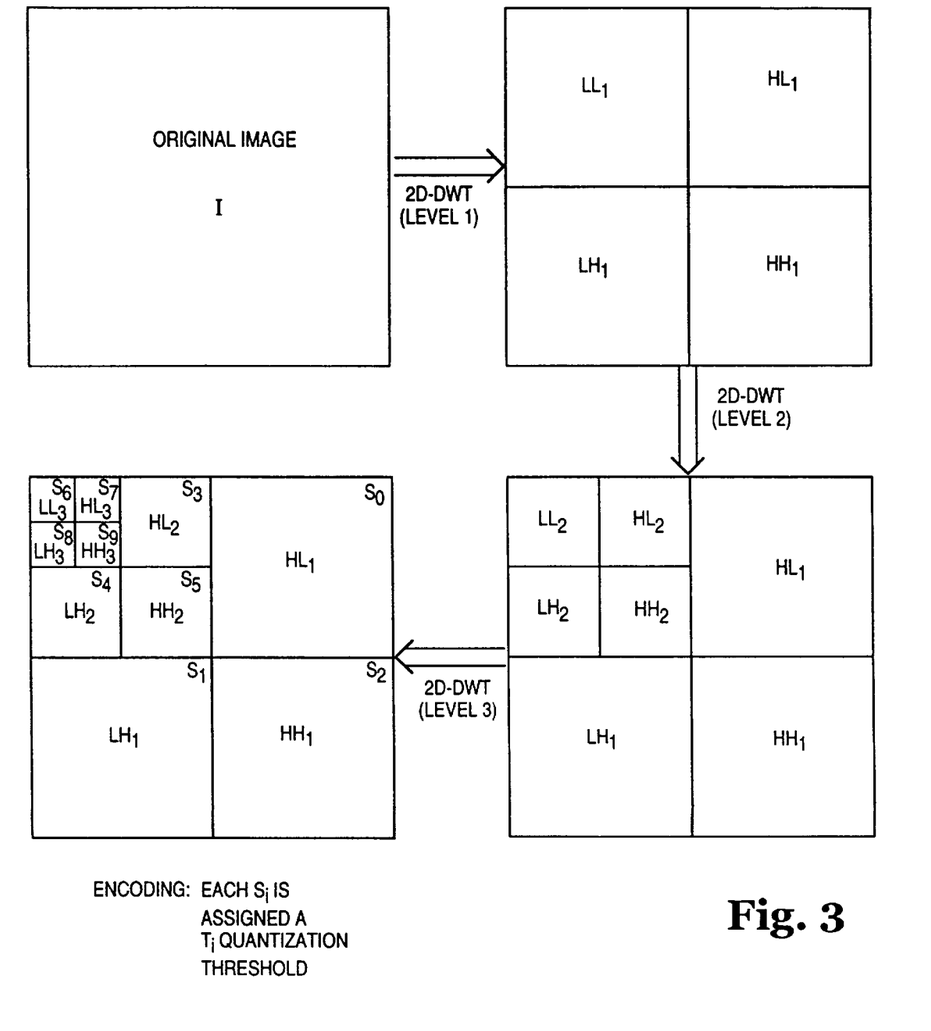
FIG. 3 illustrates a three-level DWT decomposition process and the sub-bands that it generates.

According to an embodiment of the invention shown in FIG. 1, the first step (block 110) is to subject the captured or input image to a DWT which will result in a data set that is decomposed into a number of image sub-bands (see FIG. 3 for a description of DWT sub-bands in different levels). The DWT transformed data set will have the same number of total DWT coefficients, but each value within the set may have a higher bit-depth (size) than the pixels of the original image due to peculiarities of the DWT process. Further, the image compression of FIG. 1 may be performed either on the entire image or separately upon "color planes" of the image such as R, G and B planes generated by a Bayer pattern. After the DWT, a second step known as quantization is performed (block 120).

Quantization is the process of mapping a set of n possible values to a set of m possible, where m<n. By quantizing, the total range of possible values for the each of the data in the DWT transformed image data set is reduced. One form of quantization that is the subject of an embodiment of the invention is uniform scalar quantization. In uniform scalar quantization, each data value is essentially divided by a threshold value T, and then rounded to the nearest integer (if integer math is desired). Additionally, data of each sub-band region that is generated by the DWT (from block 110) may have a separate and possibly different threshold value T assigned it. When the threshold T is modified for each sub-band, the overall compression ratio can be increased and loss of image quality can be reduced. Thus, the scalar quantization can be "uniform" within a particular sub-band, applying the same threshold T to all data values belonging to that sub-band. Thus, for each sub-band $S_i$, a quantization threshold parameter $T_i$ may be defined such that a set of quantization threshold parameters may be identified. For instance, if the DWT generates ten sub-bands using three levels of decompression, $S_0$ through $S_9$, a set of quantization threshold parameters $T_0$ through $T_9$ may be defined. According to the invention, a plurality of sets of quantization threshold parameters may be defined, with each set $T^j$ having quantization threshold parameters $T_i^j$, where i ranges from zero to one less than the number of sub-bands generated for each image by the DWT. According to the available storage, a particular set $T^j$ may be chosen and then, using that chosen set, the DWT transformed data can be quantized in a manner uniform and scalar within each sub-band (block 120). This selection process in greater detail below with respect to FIG. 1.

After quantization, the quantized data can be binary or entropy encoded (block 130). This entropy encoded data is stored into a storage mechanism which has a certain fixed size or capacity. The variable size images that may be generated by a DWT and quantization process described in prior art may not be able to guarantee that a certain and pre-specified number of images can be captured, compressed and stored in such a storage mechanism. Depending upon the precise parameters used for DWT transformation, quantization and encoding, the compression ratio, and thus, the compressed image size will vary since the original captured image is often of a fixed size (i.e., x-bits per pixel, specified number of pixels). The invention in its various embodiments provides for an adaptive compression process that can serve to advantageously optimize the compression ratio in each sub-band generated by the DWT compression and guarantee that a certain number of images can be captured and then compressed for storage onto a fixed size storage mechanism.

Further, the quantization approach adopted in this embodiment of the invention is capable of fast and easy computation giving more real-time performance to the hardware on which the compression is implemented. By exploiting the property of the DWT to create sub-bands of the image, an adaptive quantization procedure is provided in one embodiment the invention that is responsive to the storage available after each image has been captured, compressed and stored.

Figure 2:
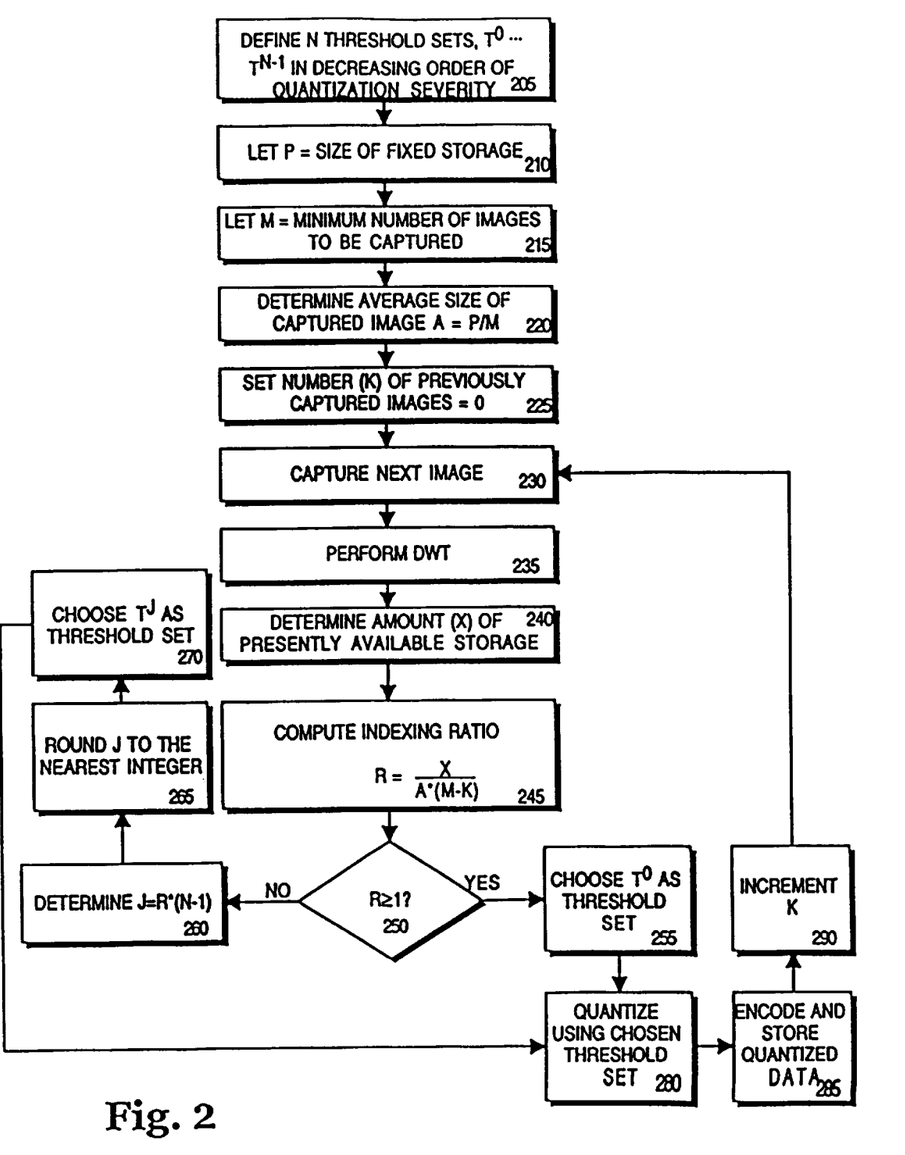
FIG. 2 is a flow diagram of an embodiment of the invention.

FIG. 2 is a flow diagram of an embodiment of the invention.

For each image that is captured, a different quantization threshold set may be chosen, with each set having thresholds for each sub-band generated by a DWT. In a given system, N quantization threshold parameter sets $T^0 \ldots T^{n-1}$ may be defined in order of decreasing "quality" and thus increasing severity of quantization (block 205). The set $T^0$ has the highest quality and thus, quantizes less roughly than the other sets. Generally, the lower the quantization threshold parameter, the better the quality since less information is lost due to the quantization. For a given sub-band $S_i$, $T_i^0 <= T_i^1 <= T_i^2 \ldots T_i^{N-1}$. Next, let P equal the size of the fixed storage into which the images are to be captured, compressed, encoded and stored (step 215). Also, let M be the minimum number of images of be captured and stored. The techniques described herein can guarantee that at least a minimum number M of images can be captured and stored into the fixed storage of size P. If the images are compressed enough, it may be possible to store more than M images. The average size A of an image that is captured compressed and stored is P/M (block 220). Before the first image is captured, a count value K tracking the number of images that have already been captured, is set to zero (block 225).

In an imaging system such as a scanner or digital camera, once it is ready, it can capture an image (block 230). Each subsequent image may be captured after the previously captured image is fully compressed or stored, or contemporaneously thereupon. The embodiment described in FIG. 2 allows image capture after compression and encoding, but depending on system design, there may be a parallel capture next image and process previous image operation. Once the image is captured, a DWT is performed (block 235) upon the image. Though the DWT is the chosen transform technique, the quantization parameter selection technique may be applied upon any transformation of the image such as a DCT. The DWT generates a set of image sub-bands (see FIG. 3 and associated description) each of which may be assigned a separate quantization threshold yielding a single "set". According to block 205, N such sets $T^0 \ldots T^{N-1}$ have been defined.

Next, the amount X of memory/space presently available in the fixed storage is determined (block 240). If no images have yet been stored, the amount of available memory/space X will equal P since all of the fixed storage will be unused (available). In order to determine which of the N quantization threshold parameter sets to use, the invention first computes an indexing ratio R (block 245). The indexing ratio R may be computed by considering a ratio of X, the presently available storage space, to average space needed to store the remaining number of images to at least approach the minimum M. This total space needed may be represented by the expression A×(M−K), where again M is the minimum number of images desired to be stored, K the number of images already captured and A, the average size of an image. This ratio R, which is X/(A×(M−K)) can then be compared to benchmarks to select the most appropriate set of quantization threshold parameters. If R is greater than or equal to one (checked at block 250), then the highest level of quality and the least severe quantization may be attained. Thus, the $T^0$ threshold set should be chosen (block 255), since in the sorted set $T^0 \ldots T^{N-1}$, $T^0$ yields the least severe quantization (i.e., has the lowest quantization threshold parameters). If the ratio R is less than 1, then only a fraction of the average space needed to store the remainder of images that together with previously stored images comprise the minimum number will actually be actually be available. When R is less than 1, an indexing parameter J is computed (block 260). The indexing parameter J selects, in a manner proportionate with the indexing ratio, the threshold set which will best preserve the average size of stored images such that the minimum images stored number can be guaranteed. Thus, J is first obtained by computing R×(N−1). The ratio R is multiplied by N−1 since of the N threshold sets, $T^0$ is already covered by the case R>=1, leaving only N−1 sets remaining to be selected from. Since this value J=R×(N−1) may not be an integer, J is rounded to the nearest integer (block 265). Finally, the set $T^J$ or the Jth set among the threshold sets is selected to be the quantization threshold parameter set (block 270). Whether $T^J$ (block 270) or $T^0$ (block 255) is selected as the most appropriate threshold set, the next step is to quantize the DWT data using that chosen set (block 280). In one embodiment, each set contains separate threshold parameters for each of the sub-bands generated by the DWT (see FIG. 3). In such an embodiment each threshold parameter in the chosen set is applied to data of a sub-band for which it is defined.

Once quantization is achieved, the quantized data set is stored and encoded (block 285). Since this changes the amount of space available to store subsequently captured images, the amount of presently available memory must be checked with each subsequent image capture (see block 240). Before the next image is captured, the counter variable K is incremented by one to reflect the presence of another image stored in the system (block 290). Then, the imaging system is ready to capture the next image (block 230) and repeat the operation described in blocks 230 to 290 to guarantee that a pre-specified minimum number M of images can be captured and stored by the imaging system.

The quality variation of the quantization threshold parameter sets helps to achieve that result in the following manner. A higher quantization threshold parameter will yield a quantized data set that has a smaller possible range of values and hence a smaller binary code. Further, a higher quantization threshold may also result in a greater number of smaller values such as zero. Such "runs" of consecutive zeroes, for instance, that may be created through quantization can be encoded by a run-length technique. Thus, the choice of a set of higher quantization threshold parameters will yield for the same image a smaller stored image, in general.

FIG. 3 illustrates a three-level DWT decomposition process and the sub-bands that it generates.

The application of a two-dimensional DWT upon an image space will result in the creation of four "sub-bands." For instance, FIG. 3 shows that an image I is decomposed by a two-dimensional DWT into four sub-bands $LL_1$, $HL_1$, $LH_1$ and $HH_1$. The "$LL_1$" sub-band is so designated based on the double low-pass DWT filtering used to generate it. The $LL_1$ sub-band is essentially a scaled approximation of the original image I, and contains the most salient image information. The sub-bands $HL_1$, $LH_1$ and $HH_1$ contain certain edge information and high-frequency noise and are so designated due to the various low-pass and high-pass DWT filtering used to generate them. Since the sub-bands $HL_1$, $LH_1$ and $HH_1$ are visual perception-wise less significant than the $LL_1$ sub-band, these sub-bands may be more "roughly" quantized (i.e., assigned a higher threshold T) so that the quantized values therein may have a lower possible range. Further, the $LL_1$ sub-band does not need to be quantized directly if this sub-band is utilized in generating higher level DWT resolution as shown in FIG. 3. The decomposition of the image I into the four sub-bands is considered a level 1 DWT. To indicate this, the subscript 1 is used after LL, HL, LH and HH.

The level 1 sub-bands $LL_1$, $HL_1$, $LH_1$ and $HH_1$ result from applying a two-dimensional DWT once to the image I. If the 2-D DWT is applied again to the sub-band $LL_1$, a level 2 2-D DWT is said to have been performed. The level 2 2-D DWT would result in the generation of four new sub-bands $LL_2$, $HL_2$, $LH_2$ and $HH_2$ which are sub-bands generated from the sub-band $LL_1$ from the level 1 2-D DWT. Like the $LL_1$ sub-band, the $LL_2$ sub-band contains the most important visual information from $LL_1$ while the $HL_2$, $LH_2$ and $HH_2$ sub-bands contain edge and noise information present in $LL_1$. A 2-D DWT may be thus applied many times to LL sub-band of each level to obtain more and more levels of DWT resolution and thus, more sub-bands.

Each DWT resolution level k contains 4 sub-bands, $LL_k$, $HL_k$, $LH_k$ and $HH_k$. The first level of DWT resolution is obtained by performing the DWT upon the entire original image, while further DWT resolution (level k+1) is obtained by performing the DWT on the $LL_k$ sub-band. The $LL_k$ sub-band contains the most significant image information representing the image or previous level sub-band $LL_{k-1}$. Also, the level K sub-bands $HL_k$, $LH_k$ and $HH_k$ contain edge and high frequency noise information of the image or previous level sub-band $LL_{k-1}$.

FIG. 3 shows the application of the DWT to achieve three levels of resolution. The original image I, the $LL_1$ sub-band, and the $LL_2$ sub-band are all subjected to the 2-D DWT and resolved into component sub-bands. The result of a three level 2-D DWT is the generation of ten sub-bands—$HL_1$, $LH_1$, $HH_1$, $HL_2$, $LH_2$, $HH_2$. $LL_3$, $HL_3$, $LH_3$ and $HH_3$-labeled $S_0$, $S_1$, $S_2$, $S_3$, $S_4$, $S_5$, $S_6$, $S_7$, $S_8$ and $S_9$, respectively. As shown in FIG. 2, once such a DWT procedure is completed, and the desired level of resolution reached, the sub-band data may be quantized in a uniform scalar manner. A single quantization threshold T may be applied for all the sub-band data such that if Y is a sub-band data value, ⌉Y/T⌈ (where ⌉a⌈ rounds a to the nearest integer) will be the quantized value. Alternatively, and in some cases advantageously, each sub-band $S_i$ may be assigned its own quantization threshold $T_i$, such that a sub-band i data value $Y_i$ has quantized value of ⌉$Y_i/T_i$⌈. For instance, for the ten sub-bands, a separate quantization threshold parameter may be defined that takes account of the particular features of each sub-band such that there are ten such quantization thresholds $T_0 \ldots T_9$.

Figure 5:
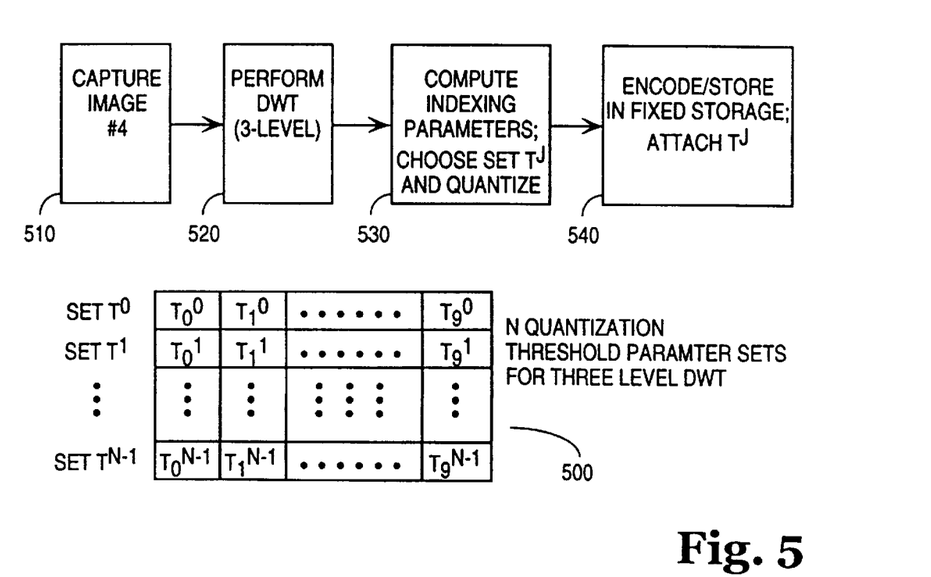
FIG. 5 shows the procedure for capturing an image and illustrates a table of N quantization threshold parameter sets.

By applying scalar quantization with a quantization threshold that is uniform with respect to a particular sub-band, the properties of that sub-band can be exploited to optimize compression while maintaining visually perceptible image quality. The applying sub-band specific quantization yields quantized sub-bands that each may have differing range of values. The sub-bands $S_0 \ldots S_g$, after sub-band uniform scalar quantization, may thus be each encoded in a slightly differing manner. Thus, each sub-band $S_i$ depicted in FIG. 3 may be assigned a corresponding $T_i$, yielding a set of ten quantization threshold parameters $T_0 \ldots T_9$. The invention selects from a plurality of such sets of threshold parameters as shown in FIG. 5.

Figure 4:
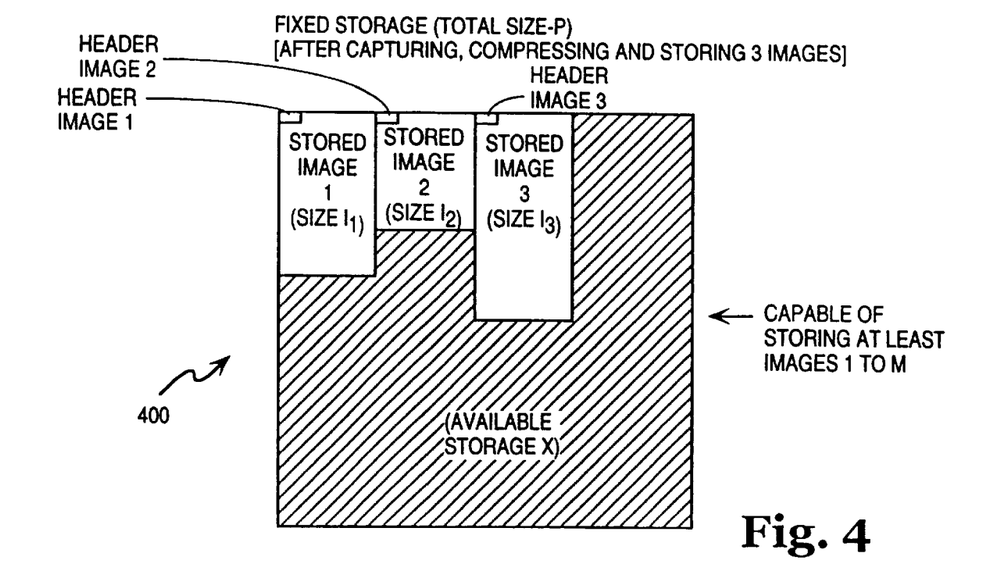
FIG. 4 illustrates one embodiment of the invention.

FIG. 4 illustrates one embodiment of the invention. FIG. 4 shows a fixed storage that has total size P. According to the invention, images that are captured are subjected to quantization in a selective and adaptive manner based upon the available storage space X remaining in the fixed storage mechanism. For each captured image one of many sets of quantization threshold parameters are selected such that at least a minimum number M of images can be captured and stored into the fixed storage. To achieve this, the deviation of the available space from the total space required on average to store the remainder of images (that would give a total of at least M) is used to select a more severe or less severe quantization. FIG. 4 shows an intermediate state of a fixed storage after three images have already been captured, compressed (quantized) and stored. In order to guarantee that the fixed storage is capable of storing at least M images, the remaining space X must be able to store at least M–' images. If the already captured images 1, 2 and 3 have stored sizes $I_1$, $I_2$ and $I_3$, respectively, and if the total capacity of the fixed storage is represented by P, then the remaining or available space X is $P-I_1-I_2-I_3$. Further, to aid in the process of decompression and rendering of the image, the set of quantization threshold parameters used to quantize each image is transmitted along with the image as a header, as shown in FIG. 4. If the next or fourth image is to be captured and stored, FIG. 5 shows the procedure to be followed and illustrates a table of N quantization threshold parameter sets.

After the three images are captured and stored into the fixed storage, then the fourth image can be captured (block 510). After capture, the fourth image may be subjected to a three-level DWT (block 520) resulting in sub-bands such as that shown in FIG. 3. Then the DWT data is ready to be quantized. According to the invention, prior to quantization, indexing parameters are first determined (block 530). Based on the index a choice of a quantization threshold parameter is made and the data is quantized using that set (block 530). FIG. 5 shows an array 500 of N quantization threshold parameter sets for a three level DWT. A three level DWT generates ten sub-bands $S_0 \ldots S_9$ each of which is assigned its own corresponding quantization threshold $T_0 \ldots T_9$ in a particular parameter set. Hence, each quantization threshold parameter set $T^k=\{T_0^k, T_1^k, \ldots T_9^k\}$ if three levels of DWT resolution are utilized. Each sub-band Si is quantized by lower threshold $T_i^j$ if the set $T^j$ is chosen. One of the sets $T^0 \ldots T^{N-1}$ is thus selected and then used to quantize the DWT result data in accordance with the indexing parameters (block 540). The fourth image is then encoded in binary and stored in the fixed storage (block 540). Though not the subject of this invention, an entropy encoding scheme which generates a variable length code tracks the quantization differential. For instance, where storage space is running low, and a more severe quantization is used, the resulting quantized data set will have a smaller possible range of values, and thus a correspondingly smaller entropy encoding. Thus, the binary encoding should also correspondingly take more or less space as needed to guarantee that the minimum number of images is storable in the fixed storage. Additionally, each image can also have sub-band-specific binary encoding parameters such as run-length size, and multiple sets of such parameters may be defined such that an encoding parameter set accompanies each quantization threshold parameter set.

Figure 6:
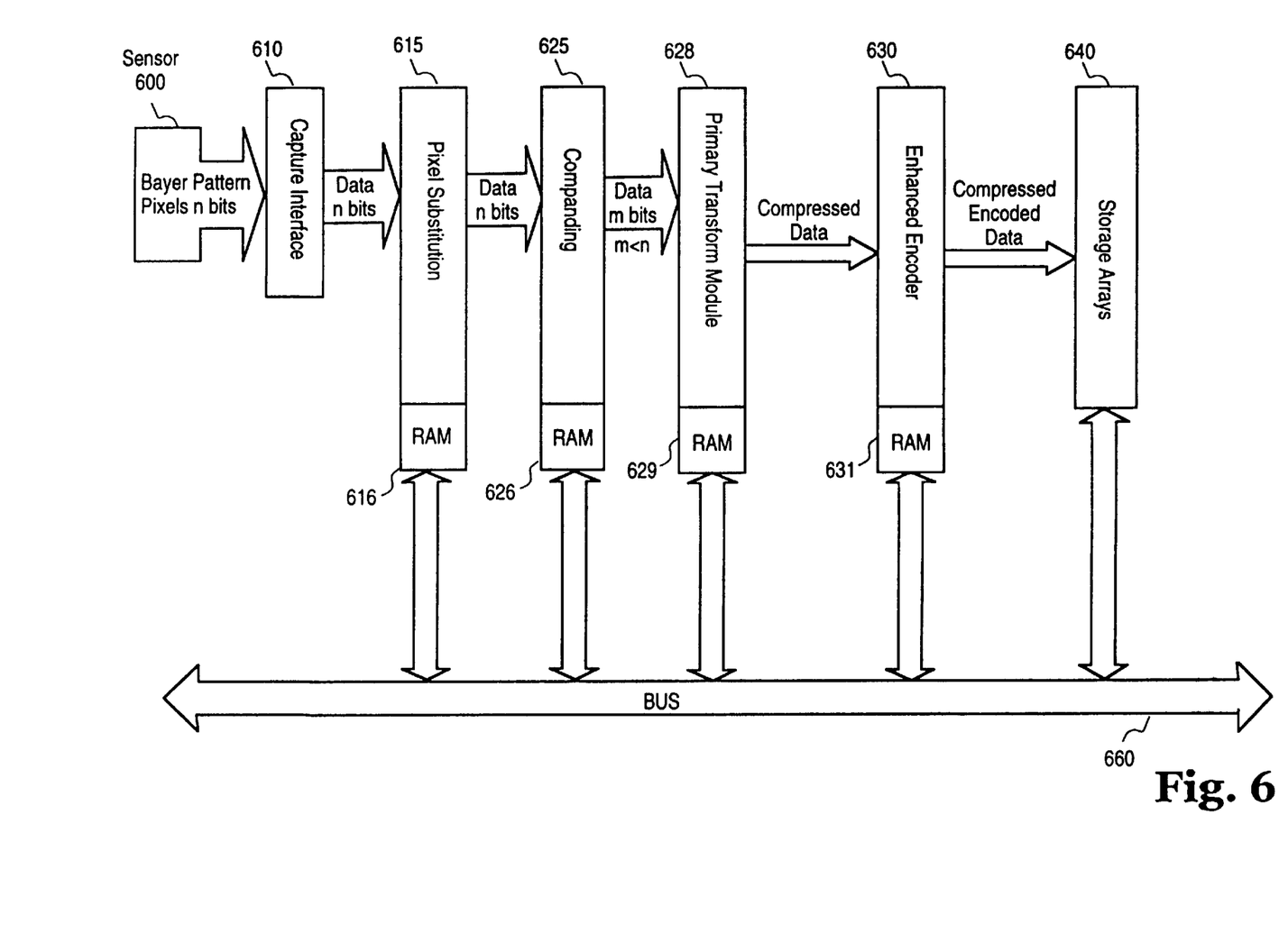
FIG. 6 is a block diagram of an image processing apparatus according to an embodiment of the invention.

FIG. 6 is a block diagram of an image processing apparatus according to an embodiment of the invention.

FIG. 6 is a block diagram of internal image processing components of an imaging device incorporating at least one embodiment of the invention including an adaptive encoder. In the exemplary circuit of FIG. 6, a sensor 600 generates pixel components which are color/intensity values from some scene/environment. The n-bit pixel values generated by sensor 600 are sent to a capture interface 610. Sensor 600 in the context relating to the invention will typically sense one of either R, G, or B components from one "sense" of an area or location. Thus, the intensity value of each pixel is associated with only one of three (or four if G1 and G2 are considered separately) color planes and may form together a Bayer pattern raw image. These R, G and B color "channels" may be compressed and encoded separately or in combination, whichever is desired by the application. Capture interface 610 resolves the image generated by the sensor and assigns intensity values to the individual pixels. The set of all such pixels for the entire image is in a Bayer pattern in accordance with typical industry implementation of digital camera sensors.

It is typical in any sensor device that some of the pixel cells in the sensor plane may not respond to the lighting condition in the scene/environment properly. As a result, the pixel values generated from these cell may be defective. These pixels are called "dead pixels". The "pixel substitution" unit 615 replaces each dead pixel by the immediate previously valid pixel in the row. A RAM 616 consists of the row and column indices of the dead pixels, which are supplied by the sensor. This RAM 616 helps to identify the location of dead pixels in relation to the captured image. Companding module 625 is designed to convert each original pixel of n-bit (typically n=10) intensity captured from the sensor to an m-bit intensity value, where m<n (typically, m=8). Companding module 625 is not needed if the sensor 600 and capture interface 610 provide an m-bit per-pixel value.

A primary compressor 628 receives companded sensor image data and performs image compression such as the DWT based compression. A RAM 629 can be used to store DWT coefficients and quantization threshold parameter sets such as those illustrated in FIG. 5. Primary compressor 628 can be designed to provide selectively quantized outputs to encoder 630. According to one embodiment of the invention, primary compressor 628 can be equipped to carry out a quantization in a sub-band specific uniform scalar manner as discussed above. A RAM 631 may be configured to store any binary encoding parameters utilized by the encoder 630. Encoder 630 provides the encoded and compressed data to storage arrays 640. As a result of selective quantization, the storage arrays 640 may be designed to guarantee the ability to store at least a predefined minimum number of images. The indexing parameter computation and subsequent selection of a quantization threshold parameter set based on the indexing parameter may all be carried out in the compressor 628. When each image is captured and ready to be stored, the current available space in the storage arrays 640 may be determined and this information may then be sent from the storage arrays over a bus 660 to the compressor 628 such that an indexing computation may be completed.

Each of the RAM tables 616, 626, 629 and 631 can directly communicate with bus 660 so that their data can be loaded and then later, if desired, modified. Further, those RAM tables and other RAM tables may be used to store intermediate result data as needed. When the stored image data in storage arrays 640 is ready to be transferred external to the imaging apparatus of FIG. 6 it may be placed upon bus 660 for transfer. Bus 660 also facilitates the update of RAM tables 616, 626, 629 and 631 as desired.

Figure 7:
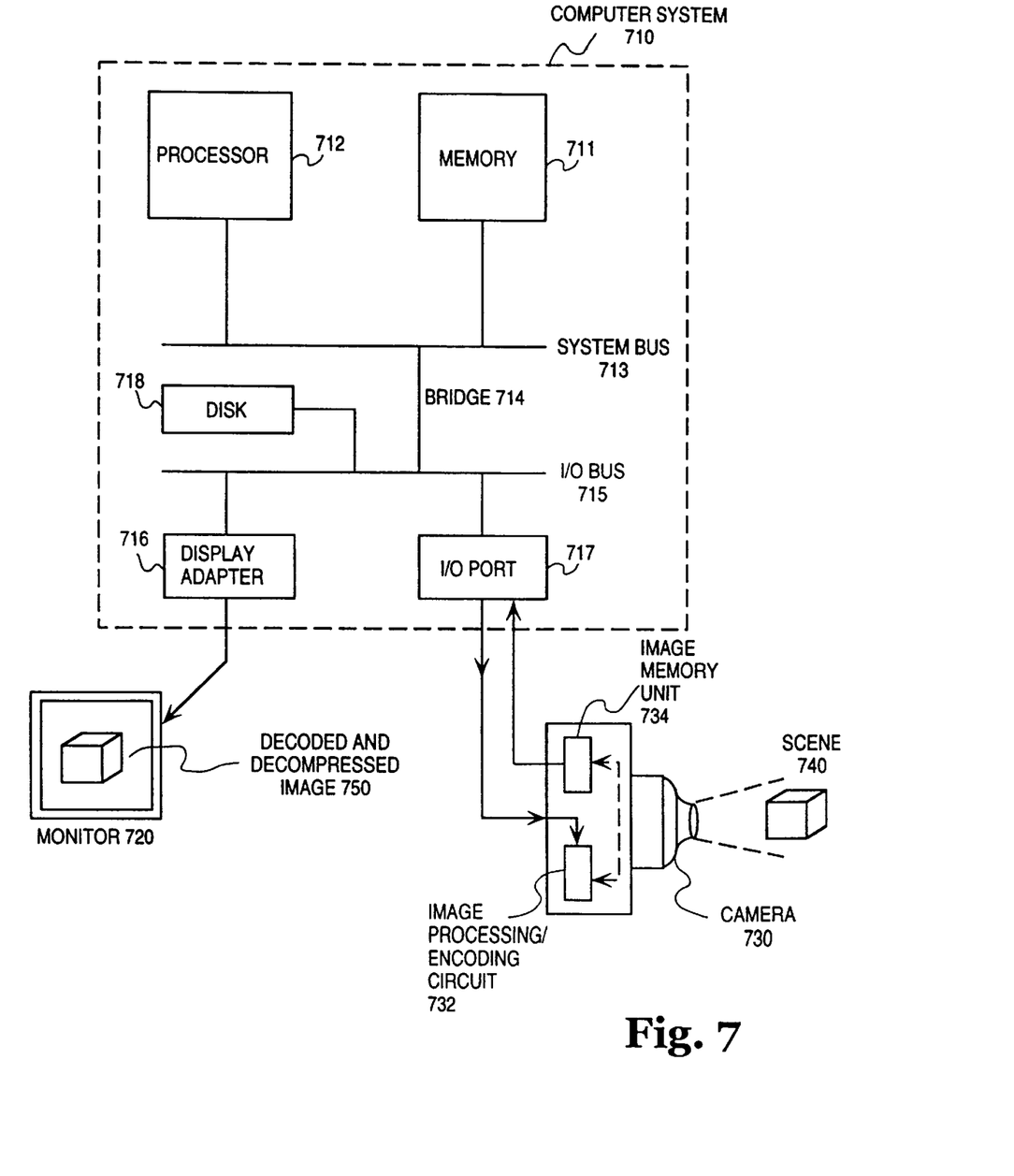
FIG. 7 is a system diagram of one embodiment of the invention.

FIG. 7 is a system diagram of one embodiment of the invention.

Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture an image of a scene 740. Essentially, captured images are processed by an image processing circuit 732 so that they can be efficiently stored in an image memory unit 734, which may be a RAM or other storage device such as a fixed disk. The images contained within image memory unit 734 that are destined for computer system 710 can be according to one embodiment of the invention, stored directly as a selectively quantized and binary encoded DWT data set. In most digital cameras that can perform still imaging, images are stored first and downloaded later. This allows the camera 730 to capture the next object/scene quickly without additional delay. The invention in its various embodiments, particularly in providing stored images that are selectively quantized allows the camera 730 to guarantee that it can "snap" or capture at least a certain minimum number of images before they need to be downloaded so that more images may be captured.

The image processing circuit 732 carries out the selective quantization described above. When a quantized and encoded image or set of images is downloaded to computer system 710, it may be decoded and then rendered to some output device such as a printer (not shown) or to a monitor device 720. Image decoding may be achieved using a processor 712 such as the Pentium™ processor (a product of Intel Corporation) and a memory 711, such as RAM, which is used to store/load instruction addresses and result data. Computer system 710 may provide to camera 730 the array of quantization threshold parameter sets needed to carry the elective quantization described above.

In an alternate embodiment, the selective quantization described above may be achieved in a software application running on computer system 710 rather than directly in camera 730. In such an embodiment, the image processing circuit may advantageously store only the original captured image. The application(s) used to perform the quantization and encoding and/or decoding after download from camera 730 may be from an executable compiled from source code written in a language such as C++. The instructions of that executable file, which correspond with instructions necessary to scale the image, may be stored to a disk 718 or memory 711. Further, such application software may be distributed on a network or a computer-readable medium such as a floppy or CD for use with other systems.

When an image, such as an image of a scene 740, is captured by camera 730, it is sent to the image processing circuit 732. Image processing circuit 732 consists of ICs and other components which execute, among other functions, the quantization of a DWT image. The image memory unit 734 will store the quantized and encoded data. Once all pixels are processed and stored or transferred to the computer system 710 for rendering the camera 730 is free to capture the next image. When the user or application desires/requests a download of images, the encoded image data in the image memory unit, are transferred from image memory unit 734 to the I/O port 717. I/O port 717 uses the bus-bridge hierarchy shown (I/O bus 715 to bridge 714 to system bus 713) to temporarily store the data into memory 711 or, optionally, disk 718. Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:

selecting a quantization threshold parameter set based upon available storage in a storage mechanism configured to store quantized image data, said selecting including, determining the average size of a captured and stored image to be a minimum number divided by the total size of said storage mechanism, determining the amount of present available storage in said storage mechanism and, computing an indexing ratio which is the ratio of said amount of presently available storage to the space required to store current image and successively captured images, the number of said current and successively captured images together with the previously stored images comprising said minimum number; and quantizing image data using said selected quantization threshold parameter set, said selecting and quantizing guaranteeing that the minimum number of quantized image data can be stored in said storage mechanism.

2. A method according to claim 1 further comprising:

defining a plurality of quantization threshold parameter sets in decreasing order of quantization severity.

3. A method according to claim 1 wherein said selecting includes:

choosing the quantization threshold parameter set with the least severe quantization to be the selected set if said indexing ratio is not less than 1; and if said indexing ratio is less than 1, converting said indexing ratio into an indexing parameter, said selecting based on said indexing parameter.

4. A method according to claim 3 wherein converting said indexing ratio into an indexing parameter includes:

computing an indexing value that results from multiplying said indexing ratio with a value one less than the total number of quantization threshold parameter sets; and rounding said indexing value to the nearest integer, said rounded indexing value constituting said indexing parameter.

5. A method according to claim 4 wherein said selected set of quantization threshold parameters is attached as a header to said quantized image data for each image quantized, said header stored in said storage mechanism.

6. A method according to claim 5 wherein selecting, quantizing and attaching is repeated for each image.

7. A method according to claim 6 wherein said each image is obtained from an imaging system.

8. A method according to claim 7 wherein said imaging system comprises a digital camera.

9. A machine implemented method comprising:

determining an average size of a captured and stored image to be a minimum number of images divided by the total size of a storage mechanism, said storage mechanism being configured to store quantized image data;

determining the amount of present available storage in the storage medium;

selecting a quantization threshold parameter set based upon said minimum number of images, said determined amount of available storage and the number of previously stored images so that the minimum number of quantized images can be stored in said storage mechanism;

quantizing image data using said selected quantization threshold parameter set; and storing said quantized image data in said storage mechanism.

10. A method according to claim 9 wherein selecting includes:

computing an indexing ratio which is the ratio of said amount of presently available storage to the space required to store current image and successively captured images, the number of said current and successively captured images together with the previously stored images comprising said minimum number.

11. A method according to claim 10 wherein said selecting includes:

if said indexing ratio is not less than 1, choosing the quantization threshold parameter set with the least severe quanitization to be the selected set; and if said indexing ratio is less than 1, converting said indexing ratio into an indexing parameter, said selecting based on said indexing parameter.

12. A method according to claim 11 wherein converting said indexing ratio into an indexing parameter includes:

computing an indexing value by multiplying said indexing ratio with a value one less than the total number of quantization threshold parameter sets; and rounding said indexing value to the nearest integer, said rounded indexing value constituting said indexing parameter.

13. A method according to claim 9 wherein said selected set of quantization threshold parameters is attached as a header to said quantized image data for each image quantized, said header stored in said storage mechanism.

14. A machine-readable medium having stored thereon data representing sequences of instructions which, when executed by a processor, cause the processor to perform operations comprising:

determining an average size of a captured and stored image to be a minimum number of images divided by the total size of a storage mechanism, said storage mechanism being configured to store quantized image data;

determining the amount of present available storage in the storage medium;

selecting a quantization threshold parameter set based upon said minimum number of images, said determined amount of available storage and the number of previously stored images so that the minimum number of quantized images can be stored in said storage mechanism;

quantizing image data using said selected quantization threshold parameter set; and storing quantized image dats in said storage mechanism.

15. A machine-readable medium according to claim 14 wherein selecting includes:

computing an indexing ratio which is the ratio of said amount of presently available storage to the space required to store current image and successively captured images, the number of said current and successively captured images together with the previously stored images comprising said minimum number.

16. A machine readable medium according to claim 15 wherein said selecting includes:

if said indexing ratio is not less than 1, choosing the quantization threshold parameter set with the least severe quantization to be the selected set; and if said indexing ratio is less than 1, converting said indexing ratio into an indexing parameter, said selecting based on said indexing parameter.

17. A machine-readable medium according to claim 16 wherein converting said indexing ratio into an indexing parameter includes:

computing an indexing value by multiplying said indexing ratio with a value one less than the total number of quantization threshold parameter sets; and rounding said indexing value to the nearest integer, said rounded indexing value constituting said indexing parameter.

18. A machine-readable medium according to claim 14 wherein said selected set of quantization threshold parameters is attached as a header to said quantized image data for each image quantized, said header stored in said storage mechanism.

19. An apparatus comprising:

an input/output port for receiving captured image data;

an image memory configured to store quantized image data produced from said received captured image data; and an image processor for selecting a quantization threshold parameter set based upon a minimum number of images to be stored in said image memory, the total size of said image memory, the amount of available storage in said image memory and the number of previously stored images so that the minimum number of quantized images can be stored in said image memory, for quantizing said received captured image data using said selected quantization threshold parameter set and for storing said quantized image data in said image memory.

20. An apparatus according to claim 19 wherein said image memory is configured to interface with a computer system, said image memory being configured to download said stored images when said image memory cannot store any other images therein.

21. An apparatus according to claim 19 including a digital camera coupled to said input/output port for providing captured images.

22. An apparatus according to claim 19 wherein said processor is further for:

computing an indexing ratio which is the ratio of said amount of presently available storage to the space required to store current image and successively captured images, the number of said current and successively captured images together with the previously stored images comprising said minimum number.

* * * * *

UNITED STATES PATENT AND TRADEMARK OFFICE
CERTIFICATE OF CORRECTION

PATENT NO.     : 6,301,392 B1
DATED          : October 9, 2001
INVENTOR(S)    : Acharya

It is certified that error appears in the above-identified patent and that said Letters Patent is hereby corrected as shown below:

<u>Column 4,</u>
Line 55, delete "$T^N$ have" and insert -- $T^{N-1}$ have --.

Signed and Sealed this

Twenty-sixth Day of November, 2002

Attest:

Attesting Officer

JAMES E. ROGAN
*Director of the United States Patent and Trademark Office*